Figure 1:
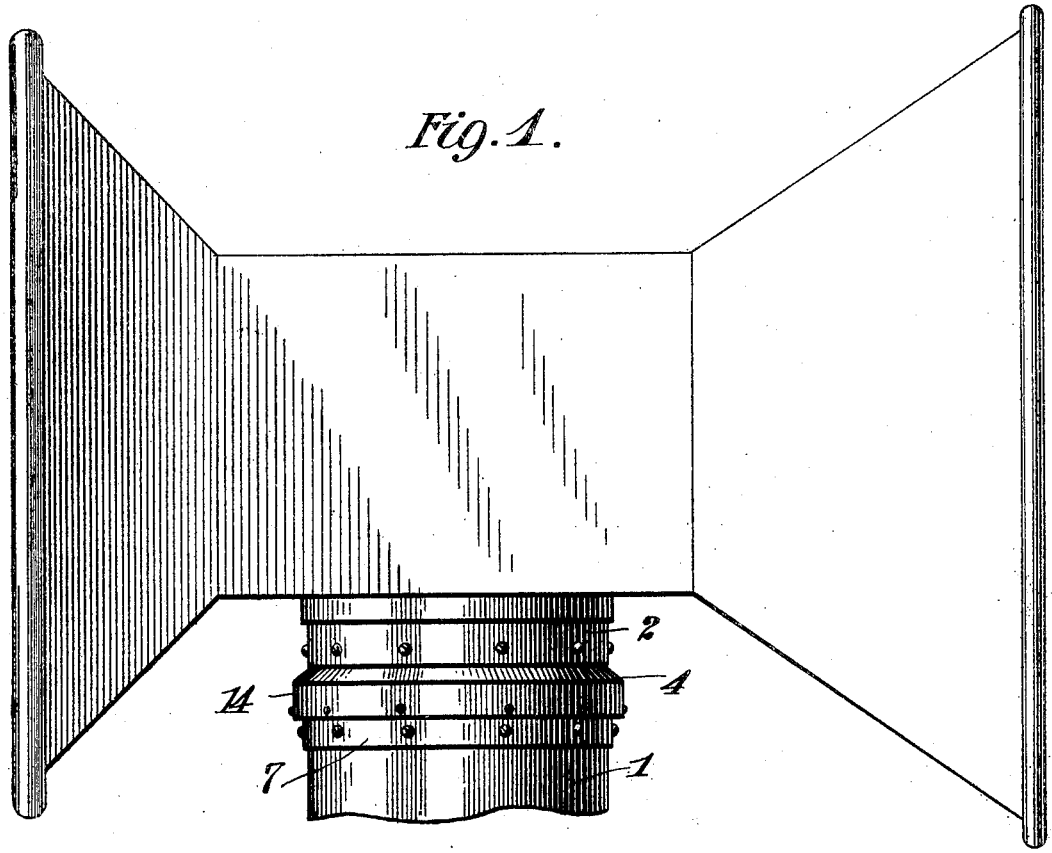

No. 798,049. PATENTED AUG. 22, 1905.
R. N. SCHALKENBACH.
BALL BEARING.
APPLICATION FILED DEC. 16, 1904.

Witnesses:
Inventor:
ROBERT N. SCHALKENBACH
By his Attorneys

UNITED STATES PATENT OFFICE.

ROBERT N. SCHALKENBACH, OF NEWARK, NEW JERSEY, ASSIGNOR TO NATIONAL VENTILATING CO., A CORPORATION OF NEW JERSEY.

BALL-BEARING.

No. 798,049.　　　Specification of Letters Patent.　　　Patented Aug. 22, 1905.

Application filed December 16, 1904. Serial No. 237,094.

*To all whom it may concern:*

Be it known that I, ROBERT N. SCHALKENBACH, a citizen of the United States, residing at Newark, in the county of Essex and State of New Jersey, have invented certain new and useful Improvements in Ball-Bearings, of which the following is a full, clear, and exact description.

In United States patent to Samuel H. Jacobson, No. 757,465, dated April 19, 1904, there are shown and described certain improvements in ventilators, the same including a vertical pipe or conduit communicating with the space or spaces to be ventilated and a rotary ventilating hood or cowl mounted thereon, the body of the cowl having a sleeve extending downwardly therefrom and fitting around the upper end of said pipe or conduit with bearings between these parts which provide for the free turning movement of the cowl. The bearings between these parts are located at the center of the pipe and sleeve and are supplemented by antifrictional rollers mounted in openings in the side wall of the pipe or conduit and adapted to be engaged by the inner surface of the sleeve, the said rollers being designed to prevent the lateral swaying movement or displacement of said cowl on said conduit. In this class of devices it is necessary that the cowl be firmly supported upon the ventilating-pipe, that antifriction-bearings be provided between the two parts to enable the cowl to be freely turned in one direction or the other by the action of the wind, that these bearings be thoroughly housed and protected, that means be provided for preventing the lateral or tipping movement of the cowl on the conduit, and that means be further provided for preventing the cowl from being disconnected entirely from the upper end of said conduit by the action of a strong wind thereon.

The present invention resides in a novel construction of ball-bearing adapted for use in connection with such a ventilator as that above described, the purpose of the same being to provide a bearing of this kind which shall be simple in construction and shall answer the requirements above enumerated; but while the bearing herein described is of special utility in connection with the ventilator and tubular structure referred to it is to be understood that the invention is not limited to such use. It may, for instance, be applied between the parts of a solid column, shaft, or pole, which may carry a weather-vane, and such column, shaft, or pole may operate in either a vertical, horizontal, or oblique position.

What I regard as new will be set forth in the claims.

Figure 2:
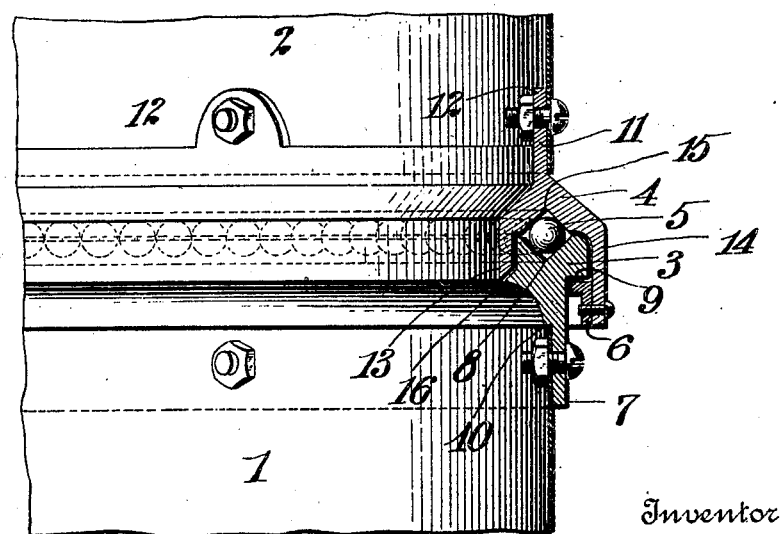

In the drawings forming part of this specification, Figure 1 is an elevation showing my improved bearing applied between the upper end of a stationary ventilating pipe or conduit and the sleeve of a rotary cowl or ventilator mounted thereon. Fig. 2 is a vertical sectional view through the parts of the bearing.

Like reference-numerals indicate like parts in the two views.

The pipe or conduit 1, which in the present instance is supposed to communicate with the various spaces to be ventilated, although it may be a solid column, is vertically disposed, and the sleeve 2, which is mounted for rotation thereon, is connected to and leads downwardly from the hood or casing of a rotary cowl or ventilator. The bearing between these parts consists of the rings 3 and 4, the balls 5, and the projecting annulus 6. The ring 3 has a central vertical web 7, by means of which it may be bolted, riveted, screwed, or otherwise secured to the upper end of the pipe or conduit 1. It also has an enlarged portion projecting above the upper edge of the conduit 1, which is provided in its upper face with a groove 8 for the reception of the balls 5. On one side of the enlarged portion of said ring 3 is a downwardly-facing shoulder 9, and on the opposite side of said ring a shoulder 10 is formed, which bears against the upper edge of the conduit 1 to receive the strain and sustain said ring and the parts carried thereby directly upon said conduit without strain upon the bolts, screws, or other securing devices. The upper ring 4 is also provided with a central vertical web 11, provided at intervals with lugs or ears 12. This web 11 fits within the lower end of the sleeve 2, and the lugs or ears 12 provide for the connection of the ring 4 with said sleeve by means of the securing bolts, screws, rivets, or the like. Beneath the web 11 the ring 4 is widened or enlarged, the widened portion terminating in the substantially parallel downwardly-extending flanges 13 and 14. Said enlarged portion of the ring 4 is also provided on its under side with a groove 15 for the reception of the balls 5, the grooves 8 and 15 being located directly opposite each other and being preferably V-shaped in cross-section. The flanges 13 and 14 of the upper ring 4 embrace the upper enlarged portion of the lower ring 3 and form a housing therefor, which thoroughly protects the ball-race and prevents the entrance of foreign matter thereto. To increase the effectiveness of this housing, the lower end of the flange 13 is angularly cut away, as shown at 16, and the enlarged portion of the ring 3 is formed with an inwardly-extending rib corresponding in shape and position with said cut-away portion. The flange 14 extends downwardly to a point beneath the shoulder 9 on the ring 3 and has the projection or annulus 6 secured to its inner surface. This annulus may be in the form of a continuous strip of angle-iron, bolted, screwed, or otherwise secured to said flange, or it may be in pieces bolted at intervals to the flange 14. The upper face of said annulus or projection lies directly beneath the shoulder 9, and in the event of any tendency of the sleeve 2 or the rotary ventilator carried by said sleeve to tip or tilt said annulus or projection will engage said shoulder and prevent such tipping or tilting to any marked degree. This annulus or projection also serves to prevent the entire disconnection of the ventilator or its sleeve 2 from the pipe or conduit 1, and it serves, moreover, to more completely house and protect the balls and prevent the access of water, dirt, or other foreign matter thereto.

The grooves 8 and 15 in the rings 3 and 4 and the balls 5 in said grooves are in substantial alinement with the pipe 1 and sleeve 2 or the outer surfaces of the two pipe or shaft sections. By this arrangement the active parts of the bearing are enabled to take the strain of the direct thrust, and greater strength and durability of the bearing are thus obtained.

It will be seen that the bearing between the parts 1 and 2 is simple in construction, cheaply made, and readily applied. When in place, the rotary sleeve 2 and the ventilator or cowl thereon are firmly supported at all points, tilting of the sleeve or ventilator is prevented, and the disconnection of said sleeve or ventilator from the pipe or conduit 1 is effectually avoided.

If the bearing is applied to a solid shaft instead of a conduit, two sections of which are to be rotatable with respect to each other, the members 3 and 4 of the bearing will be secured, respectively, to the abutting ends of the shaft-sections and will operate in the same way and for the same purpose.

Having described my invention, I claim—

1. The combination with a pipe or conduit and a rotary sleeve mounted thereon, of a ball-bearing between said parts, the same comprising rings secured respectively to said pipe and sleeve and having registering grooves for the reception of balls in substantial alinement with said pipe and sleeve, one of said rings having a shoulder therein and the other having a projection adapted to engage said shoulder for preventing the separation of said parts.

2. The combination with a pipe or conduit and a rotary sleeve mounted thereon, of a ball-bearing between said parts, the same comprising a ring secured to the upper end of said conduit, having a groove in its upper surface and a downwardly-facing shoulder on one side, a ring secured to the lower end of said sleeve having a groove in its lower surface corresponding with the groove in the first ring and having a pair of side flanges extending along opposite sides of the lower ring, one of said flanges having a projection thereon adapted to engage said shoulder, and balls in said grooves.

3. The combination with a pipe or conduit, and a rotary sleeve mounted thereon, of a ball-bearing between said parts, the same comprising a ring secured to the upper end of said conduit, having a groove in its upper surface and a downwardly-facing shoulder on one side, a ring secured to the lower end of said sleeve having a groove in its lower surface corresponding with the groove in the first ring and having a pair of side flanges extending along opposite sides of the lower ring, one of said flanges projecting below said shoulder, an annulus secured to the inner surface of the latter flange adapted to engage said shoulder, and balls in said grooves.

4. The combination with a sectional pipe or shaft, of a ball-bearing between the sections thereof, the same comprising rings secured respectively to the adjacent ends of the sections and having registering grooves for the reception of the balls in substantial alinement with the outer surfaces of the sections, one of said rings having a shoulder thereon and the other having a projection adapted to engage said shoulder for preventing the separation of said parts.

5. The combination with a sectional pipe or shaft, of a ball-bearing between the sections thereof, the same comprising a ring secured to the end of one section, having a groove in its face and a shoulder on one side, a ring secured to the adjacent end of the other section having a groove in its face corresponding with the groove in the first ring and having a pair of side flanges extending along opposite sides of the said other ring, one of said flanges having a projection thereon adapted to engage said shoulder, and balls in said grooves.

6. The combination with a sectional pipe or shaft, of a ball-bearing between said parts, the same comprising a ring secured to the end of one section, having a groove in its face and a shoulder on one side, a ring secured to the adjacent end of the other section having a groove in its face corresponding with the groove in the first ring and having a pair of side flanges extending along opposite sides of the said other ring, one of said flanges projecting below said shoulder, an annulus secured to the inner surface of the latter flange and adapted to engage said shoulder, and balls in said grooves.

In witness whereof I subscribe my signature in the presence of two witnesses.

ROBERT N. SCHALKENBACH.

Witnesses:
WM. M. STOCKBRIDGE,
CHAS. McC. CHAPMAN.